United States Patent [19]

Agarwal et al.

[11] 4,370,432
[45] Jan. 25, 1983

[54] HOT MELT ADHESIVE COMPOSITIONS OF NEUTRALIZED SULFONATED EPDM AND TACKIFIER MIXTURE

[75] Inventors: Pawan K. Agarwal, Westfield; Robert D. Lundberg, Bridgewater, both of N.J.

[73] Assignee: Exxon Research and Engineering Co., Florham Park, N.J.

[21] Appl. No.: 299,592

[22] Filed: Sep. 4, 1981

[51] Int. Cl.$^3$ .................... C08L 23/32; C08L 23/16; C08L 23/20
[52] U.S. Cl. .................... 524/216; 524/210; 524/251; 524/300; 524/394; 524/426; 524/445; 524/451; 524/518; 524/525; 524/526; 525/192; 525/194; 525/195; 525/196; 525/210; 525/211; 525/212; 525/232; 525/237; 525/240
[58] Field of Search ............ 525/194, 192, 196, 211, 525/212, 210, 240, 232, 237; 524/216

[56] References Cited

U.S. PATENT DOCUMENTS

| | | | |
|---|---|---|---|
| 3,642,728 | 2/1972 | Canter | 260/79.3 |
| 3,801,531 | 4/1974 | Berejka et al. | 260/33.6 AQ |
| 3,867,247 | 2/1975 | O'Farrell et al. | 161/88 |

*Primary Examiner*—Carman J. Seccuro
*Attorney, Agent, or Firm*—Richard E. Nanfeldt

[57] ABSTRACT

This invention relates to hot melt adhesive compositions which includes a neutralized sulfonated elastomeric polymer having about 5 to about 50 meq. of neutralized sulfonate groups per 100 grams of the neutralized sulfonated elastomeric polymer, about 25 to about 250 parts by weight of a polyisobutylene per 100 parts of the neutralized sulfonated elastomeric polymer, and about 25 to about 250 parts by weight of a hydrocarbon resin of a petroleum or coal tar distillate, aliphatic dienes and mono and diolefins, cyclic olefins of 5 or 6 carbon atoms and hydrogenated poly cyclics per 100 parts by weight of the neutralized sulfonated EPDM terpolymer.

11 Claims, No Drawings

HOT MELT ADHESIVE COMPOSITIONS OF NEUTRALIZED SULFONATED EPDM AND TACKIFIER MIXTURE

FIELD OF THE INVENTION

This invention relates to hot melt adhesive compositions which includes a neutralized sulfonated elastomeric polymer wherein the neutralized sulfonated elastomeric polymer has about 5 to about 50 meq. of neutralized sulfonate groups per 100 grams of the neutralized sulfonated elastomeric polymer, and about 25 to about 250 parts by weight of a polyisobutylene per 100 parts of the neutralized sulfonated polymer, which optionally contains about 25 to about 250 parts by weight of a hydrocarbon resin of a petroleum or coal tar distillate, having about 5 to about 6 carbon atoms the hydrocarbon resin being composed of aliphatic dienes and monoolefins per 100 parts by weight of the neutralized sulfonated elastomeric polymer.

Broadly speaking, synthetic adhesive used in packaging can be classified into four categories: water based, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed. Beside this energy requirement for the formation of the bond, there is another complication with the use of water based adhesive. For a uniform coating a good uniform wetting of the substrate surface is desired which is not easily achieved.

With the solvent-based adhesives usually a good wetting is achieved; however, their use has been becoming extremely restrictive due to expensive energy requirements for the evaporation of organic solvents fire hazards associated with the use of these organic solvents and emissions problems with said solvents. The strict government environmental regulations and restrictions concerning worker's exposure to solvent vapors, etc. has placed extra pressure on the packager to use non-solvent based adhesives.

Recently the use of hot melt adhesives has been growing very rapidly in the packaging industry. The hot melt adhesives are generally applied (as the name implies) by conventional extrusion or coating techniques in the temperature range of 250° to 450° F. on one of the surfaces to be bonded. The other surface is brought in contact with the hot surface for a sufficient period of time for the melt to cool, whereupon solidification a strong and durable bond is formed.

The key requirements of resins suitable for hot melt adhesive applications are that they should have good physical properties, e.g., tensile strength, etc., at ambient conditions, and they can flow easily at fabrication temperatures. The ethylene vinyl acetate (EVA) copolymers and styrene block copolymers, such as Kraton, have been extensively used as hot melt adhesives; however, their use has been limited largely to pressure sensitive adhesives.

There is a significant demand in the marketplace today for polymer systems which exhibit good green strength or tensile properties at ambient temperatures which, when heated to a predetermined temperature, will give good flow such that they may be applied to a coating or substrate by melt extrusion or other suitable techniques. In the past it has been common to employ organic solutions as a way of applying a coating of a polymer system which is designed to have good adhesive properties. This practice is now under considerable pressure, due to the fact that the organic solvents must be evaporated from the coating giving rise to pollution problems and excess energy requirements.

PRIOR ART

Several U.S. Patents have described sulfonated polymers such as sulfonated butyl and sulfonated EPDM in adhesive applications (e.g. U.S. Pat. Nos. 3,867,247 and 3,801,531). It is important to distinguish the instant invention over those prior art systems. The former patent is directed at a sulfonated butyl cement which is solvent based and is employed to laminate various substrates. It is important to note that the instant invention differs dramatically from that patent as follows:

(a) The adhesives of the instant invention are not deposited from solvents but are hot melt and require no solvents in their preferred method of utilization.

(b) The instant invention may optionally include a preferential plasticizer capable of associating with the metal sulfonate groups and thereby reducing the melt viscosity of the resulting blends to make the systems more processable.

(c) The instant invention is directed at sulfonated ethylene propylene terpolymers or sulfonated EPDM, whereas most of the prior art deals with sulfonated butyl rubber (e.g. U.S. Pat. No. 3,867,247).

With regard to the latter point, historically EPDM systems do not possess good tack properties and substantial art exists directed towards improving the adhesive characteristics of such systems. This problem becomes even more acute when EPDM is sulfonated to levels of 5 to 50 milliequivalents (meq.) per 100 grams of polymer and neutralized. The resulting compositions have been widely used as the basis for thermoplastics elastomers (i.e. U.S. Pat. Nos. 4,157,992; 4,014,831 etc.). The use of these materials in such application is, in part, a demonstration that the properties of such materials are just the opposite of those desired for adhesive. In fact such materials are remarkably devoid of tack or adhesion. The task, therefore, of converting such physically crosslinked materials into suitable adhesive candidates is a particularly challenging one for two reasons: (a) the EPDM backbone is particularly unsuited for that purpose being a very dry elastomer; (b) the strong associations attributable to metal sulfonate crosslinks further inhibit adhesion to any particular substrate.

Despite these handicaps there are some very good reasons for solving the problems associated with converting sulfonated EPDM into a good hot melt adhesive composition. The excellent thermal stability inherent in the EPDM backbone is a very desirable property for adhesives which will be exposed to high temperatures for long times. Most adhesives based on other elastomeric backbones can suffer degradation under those conditions.

In the past, several attempts have been made for use metal sulfonated EPDM's to achieve the same objectives. The sulfonated EPDM polymers have good cohesive properties at room temperature and flow easily at elevated temperatures when used with certain plasticizers. However, because of the very untacky nature of the polymer backbone these materials as such are extremely difficult to be formulated successfully in tackifying blend systems.

Recently it has been surprisingly found that certain blends of metal sulfonated EPDM's when incorporated with low molecular weight polyisobutylenes such as Exxon's Vistanex-LM yield systems which are mechanically compatible and have excellent tackifying characteristics. These blends also possess good properties as well. The extent of tackiness and physical properties including that of the viscous nature of the system can easily be controlled by the desired amounts of plasticizers and commercial tackifying resins.

SUMMARY OF THE INVENTION

This invention relates to hot melt adhesive compositions which includes a neutralized sulfonated elastomeric polymer, wherein the neutralized sulfonated elastomeric polymer is preferably an EPDM terpolymer having about 5 to about 50 meq. of neutralized sulfonate groups per 100 grams of the neutralized sulfonated elastomeric polymer, about 25 to about 250 parts by weight of a polyisobutylene per 100 parts by weight of the neutralized sulfonated EPDM terpolymer and optionally about 25 to about 250 parts by weight of a hydrocarbon resin of a petroleum or coal tar distillate, having about 5 to about 6 carbon atoms, said hydrocarbon resin having aliphatic dienes and monoolefins therein per 100 parts by weight of the neutralized sulfonated EPDM terpolymer and optionally, about 1 to about 50 parts of a preferential plasticizer per 100 parts of the neutralized sulfonated EPDM terpolymer can be added to the composition.

GENERAL DESCRIPTION

The present invention relates to unique and novel hot melt adhesive compositions which comprise a blend of a neutralized sulfonated elastomeric polymer which is preferably an EPDM terpolymer, a polyisobutylene and a hydrocarbon resin, wherein to the compositions can be optionally added an ionic preferential plasticizer oil, and/or a filler thereby modifying the rheological and physical properties of the hot melt adhesive compositions.

A. SULFONATED POLYMER AND PROCESS FOR FORMING

The neutralized sulfonated elastomeric polymers of this present instant invention are derived from unsaturated polymers wherein an EPDM terpolymer is preferred.

EPR or EPDM polymers are known in the rubber industry as very dry rubbers meaning that they are relatively non-tacky, and indeed are very limited in adhesive applications for that reason. Therefore, the instant invention is specifically attractive for sulfonated EPDM systems in that these materials possess a very high degree of ionic crosslinking which can be controlled by plasticization yet can be modified with the blends taught herein to have good adhesive qualities. This combination of good adhesion and adequate tensile properties is highly sought in a number of adhesive applications, yet is particularly difficult to achieve with the sulfonated ethylene propylene terpolymers. This invention describes how such elastomers can be blended to achieve some of these desirable properties.

The EPDM terpolymers are low unsaturation polymers having about 1 to about 10.0 wt.% olefinic unsaturation, more preferably about 2 to about 8, most preferably about 3 to 7 defined according to the definition as found in ASTM D-1418-64 and is intended to mean terpolymers containing ethylene and propylene in the backbone and a diene in the side chain. Illustrative methods of producing these terpolymers are found in U.S. Pat. No. 3,280,082, British Pat. No. 1,030,289 and French Pat. No. 1,386,600, which are incorporated herein by reference. The preferred polymers contain about 40 to about 50 wt.% ethylene and about 1 to about 10 wt.% of a diene monomer, the balance of the polymer being propylene. Preferably, the polymer contains about 45 to about 65 wt.% ethylene, more preferably 45 to 60 wt.% e.g., 50 wt.% and about 2.6 and about 8.0 wt.% diene monomer, e.g., 5.0 wt.%. Such EPDM polymers are substantially noncrystalline meaning they possess less than 20% crystallinity as determined by X-ray techniques. The diene monomer is preferably a non-conjugated diene. Illustrative of these non-conjugated diene monomers which may be used in the terpolymer (EPDM) are 1,4-hexadiene, dicyclopentadiene, 5-ethylidene-2-norbornene, 5-methylene-1-norbornene, 5-propenyl-2-norbornene and methyltetrahydroindene. A typical EPDM is Vistalon 2504 (Exxon Chemical Co.), a terpolymer having a Mooney viscosity (ML, 1+8, 212° F.) of about 40 and having an ethylene content of about 50 wt.% and a 5-ethylidene-2-norbornene content of about 5.0 wt.%. The $\overline{M}n$ as measured by GPC of Vistalon 2405 is about 47,000, the $\overline{M}v$ as measured by GPC is about 145,000 and the Mw as measured by GPC is about 174,000. Another EPDM terpolymer Vistalon 2504-20 is derived from Vistalon 2504 (Exxon Chemical Co.) by a controlled extrusion process, wherein the resultant Mooney viscosity (ML, 1+8, 212° F.) is about 20. The $\overline{M}n$ as measured by GPC if Vistalon 2504-20 is about 26,000, the $\overline{M}v$ as measured by GPC is about 90,000 and the $\overline{M}w$ as measured by GPC is about 125,000. Nordel 1320 (DuPont) is another terpolymer having a Mooney viscosity (ML, 1+8, 212° F.) of about 25 and having about 53 wt.% of ethylene, about 3.5 wt.% of 1,4-hexadiene, and about 43.5 wt.% of propylene.

Another EPDM terpolymer Vistalon (MD-76-5) is a terpolymer having a Mooney viscosity (ML, 1+8, 212° F.) of about 20, and Mn as measured by GPC of about 60,000 and a wt.% ethylene content of about 55.

The EPDM terpolymers of this invention have a number average molecular weight ($\overline{M}n$) as measured by GPC of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 5 to about 40. The $\overline{M}v$ as measured by GPC of the EPDM terpolymer is preferably below about 350,000 and more preferably below about 300,000. The Mw as measured by GPC of the EPDM terpolymer is preferably below about 500,000 and more preferably below about 350,000.

The sulfonate EPDM terpolymers are formed by dissolving the elastomeric polymer in a non-reactive solvent such as chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, incorporated herein by reference. The sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene or triethyl phosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the EPDM terpolymer backbone. The reaction is quenched with an aliphatic alcohol such as methanol, ethanol or isopropanol, with an aromatic hydroxyl compound, such as phenol, as cycloaliphatic alcohol such as cyclohexanol or with water. The sulfonated EPDM terpolymer has about 5 to about 50 meq. sulfonate groups per 100 grams of sulfonated polymer, more preferably about 5 to about 40; and most preferably about 7 to about 20. The meq. of sulfonate groups per 100 grams of polymer is determined by both titration of the polymeric sulfonic acid and Dietert Sulfur analysis. In the titration of the sulfinated polymer, the polymer is dissolved in solvent consisting of 95 parts of toluene and 5 parts of methanol at a concentration level of 50 grams per liter of solvent. The sulfonated EPDM terpolymer is titrated with ethanolic sodium hydroxide to an Alizarin-Thymolphthalein end-point.

The sulfonated EPDM terpolymer is gel free and hydrolytically stable. Gel is measured by stirring a given weight of polymer in a solvent comprises of 95 toluene-5-methanol at a concentration of 5 wt.%, for 24 hours, allowing the mixture to settle, withdrawing a weighed sample of the supernatant solution and evaporating to dryness. Hydrolytically stable means that the acid function, in this case the unneutralized sulfonate groups, will not be eliminated under neutral or slightly basic conditions to a neutral moiety which is incapable of being converted to highly ionic functionality.

Neutralization of the sulfonated EPDM terpolymer is done by the addition of a solution of a basic salt to the unneutralized sulfonated EPDM terpolymer dissolved in the mixture of the aliphatic alcohol and non-reactive solvent. The basic salt is dissolved in a binary solvent system consisting of water and/or an aliphatic alcohol. The counterion of the basic salt is selected from a carboxylic acid having from about 1 to about 4 carbon atoms, a hydroxide, or alkoxide having about 1 to about 4 carbon atoms, and mixtures thereof. The preferred neutralizing agent is a metal acetate, more preferably zinc acetate. Sufficient metal salt of the carboxylic acid is added to the solution of the acid form of the elastomeric polymer to effect neutralization. It is preferable to neutralize at least 95% of the unneutralized sulfonate groups, more preferably about 98%, most preferably 100%. Examples of metal oxides useful in preparing metal sulfonates are MgO, CaO, BaO, ZnO, $Ag_2O$, $PbO_2$, and $Pb_3O_4$. Useful examples of metal hydroxides are NaOh, KOH, LiOh, $Mg(OH)_2$ and $Ba(OH)_2$. Alternatively, the unneutralized sulfonated EPDM terpolymer can be neutralized with an organic amine such as described in U.S. Pat. No. 3,642,728 which is incorporated herein by reference.

B. PLASTICIZERS

The metal sulfonate containing polymers at higher sulfonate levels can possess extremely high melt viscosities and are thereby difficult to process. The optional addition of ionic group (preferential) plasticizers markedly reduces melt viscosity and frequently enhances physical properties. To the neutralized sulfonated EPDM terpolymer is added, in either solution or to the crumb of the sulfonated EPDM terpolymer, a preferential plasticizer selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, ammonium, lead and Groups IA, IIA, IB and IIB of the Periodic Table of Elements and mixtures thereof. The carboxylic acids are selected from the group consisting of lauric, myristic, palmitic and stearic acids and mixtures thereof; e.g., zinc stearate, magnesium stearate, or zinc laurate.

The preferential plasticizer is incorporated into the neutralized sulfonated EPDM terpolymer at about 1 to about 50 parts by weight based on 100 parts by weight of the neutralized sulfonated polymer, more preferably at about 2 to about 25, and most preferably at about 3 to about 20. The metallic salt of the carboyxlic acid can also be used as neutralizing agent. In the case of the neutralizing agent and plasticizer being the identical chemical species, additional metallic salt is added over the required levels of neutralization. Alternatively, other preferential plasticizers are selected from amines, amides such as stearamide, ammonium and amine salts of carboxylic acids and mixtures thereof. The preferred plasticizers are selected from carboxylic acids having about 8 to about 22 carbon atoms or metallic salts of these carboxylic acids and mixtures thereof. The resultant neutralized sulfonated elastomeric polymer with preferential plasticizer is isolated from the solution by conventional steam stripping and filtration.

C. COMMERCIAL TACKIFIER RESINS

If desired, to the hot melt adhesive composition is added a commercial tackifying resin having a softening point of about 0° to about 160° C., more preferably about 50° to about 140° C. and most preferably about 70° to 120° C. A variety of commercial tackifier resins are available. Some of these resins contain α and/or β pirene base polyterpene resins as the main ingredient while others are derived from the polymerization of petroleum or coal distillates which consist of aliphatic dienes, mono and di-olefins and cyclic olefins having about 5 to about 6 carbon atoms. The latter type of tackifiers have primarily piperlene and/or isoprene structure. A general but excellent description of tackifying resins derived from Petroleum derivatives can be found in, for example, *Encyclopedia of Polymer Science and Technology*, Vol. 9, Pages 853–860, chapter by John Findlay, Published by John Wiley & Sons, New York (1968).

Typical but non-limiting tradenames of these commercial tackifiers are Wintak of Goodyear, Escorez of Exxon, Piccolyte of Hercules and Zonrez of Arizona Chemicals. Recently these and various other companies have also started marketing relatively higher softening point resins. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often their initial color (Gardner) is about 3.0 to about 7.0 and the density from about 0.7 to 1.0 gm/cm$^3$ at room temperature. The acid number of these resins is usually less than 1. In general, the molecular weight of these commercial tackifying resins is not homogeneous, it speards in number average molecular weight Mn can be from about 300 to about 5000 and more preferably about 500 to about 2000 and most preferably about 700 to 1600.

As well-known to those familar with the use of tackifying resins, because of their wide range compatability, a number of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the hot melt adhesive composition at about 25 to about 250 parts by weight per 100 parts by weight of the neutralized sulfonated EPDM terpolymer rubbers, more preferably about 30 to about 125 and most preferably about 35 to about 100.

D. POLYISOBUTYLENE

To the hot melt adhesive composition is added a polyisobutylene elastomer which has been Mn as measured by GPC of about 1,000 to about 200,000, more preferably about 2,000 to about 100,000, and most preferably about 2,500 to about 50,000, and a Mooney viscosity (M.L., 1+8) of about 1 to about 40, more preferably about 1 to about 30, and most preferably about 1 to about 20.

A typical polyisobutylene which is useful in the instant invention is Vistanex-LM which is manufactured by Exxon Chemical Company and has an Mn as measured by GPC of about 5,000 and a Mooney viscosity (M.L., 1+8) of about 2.

The polyisobutylene is incorporated into the adhesive composition at a concentration level of about 25 to about 250 parts by weight per 100 parts of the sulfonated EPDM terpolymer, more preferably about 25 to about 200, and most preferably about 25 to about 150.

E. METHOD OF FORMING BLEND ADHESIVE COMPOSITION

The blend compositions of neutralized sulfonated elastomeric polymer with or without preferential plasticizer and the hydrocarbon tackifier resin can be formed by techniques well known in the art. For example, the blend composition of the hot melt adhesive can be compounded on a hot two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrell Continuous Mixer, a twin screw extruder, or tandem extrusion techniques which are continuous mixing types of equipment. The Banbury mixing device is the preferred batch type mixer, and the twin screw extruder is the preferred continuous mixer.

F. EXTENDED BLEND ADHESIVE COMPOSITION

To the blend compositions of the hot melt adhesive compositions can be added fillers which are selected from the group consisting of talcs, ground calcium carbonate, water precipitated calcium carbonate, delaminated, calcined or hydrated clays, silicas, and carbon blacks, and mixtures thereof. These fillers are incorporated into the blend composition at about 1 to about 150 parts by weight per 100 parts by weight of the neutralized sulfonated elastomeric polymer, more preferably at about 30 to about 100. Typically, these fillers have a particle size of about 0.03 to about 20 microns, more preferably about 0.3 to about 10, and most preferably about 0.5 to about 10. The oil absroption as measured by grams of oil absorbed by 100 grams of filler if about 10 to about 100, more preferably about 10 to about 85 and most preferably about 10 to about 75. Typical fillers employed in this invention are illustrated in Table I.

F. OIL EXTENDED ADHESIVE COMPOSITIONS

It is observed that the blend composition of the instant invention can also include oils to further improve low temperature properties and tack characteristics of the resulting adhesive. Levels of oil of less than about 25 parts by weight per 100 parts of the neutralized sulfonated elastomeric polymer rubber can be incorporated, more preferably about 1 to about 20 parts. Oils are particularly useful when high levels of petroleum resin tackifiers are used since such materials can harden the resulting composition. Oils can further soften and reduce the cost. Typical oils that can be used may be low viscosity aromatic, naphthenic or paraffinic petroleum oils, having less than 2 weight percent polar type compounds. Typical oils are illustrated in Table II.

TABLE I

| Filler | Code # | Oil Absorption grams of oil/100 grams of filler | Specific Gravity | Avg. Particle Size Micron | pH |
|---|---|---|---|---|---|
| Calcium Carbonate Ground | Atomite | 15 | 2.71 | | 9.3 |
| Calcium Carbonate Precipitated | Purecal U. | 35 | 2.65 | .03–.04 | 9.3 |
| Delaminated Clay | Polyfil DL | 30 | 2.61 | 4.5 | 6.5–7.5 |

TABLE I-continued

| Filler | Code # | Oil Absorption grams of oil/100 grams of filler | Specific Gravity | Avg. Particle Size Micron | pH |
|---|---|---|---|---|---|
| Hydrated Clay | Suprex | | 2.6 | 2 | 4.0 |
| Calcined Clay | Icecap K | 50–55 | 2.63 | 1 | 5.0–6.0 |
| Magnesium Silicate | Mistron Vapor | 60–70 | 2.75 | 2 | 9.0–7.5 |

TABLE II

| Type Oil | Oil Code # | Viscosity ssu | Mn | % Polars | % Aromatic | % Saturates |
|---|---|---|---|---|---|---|
| Paraffinic | Sunpar 115 | 115 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

G. METHOD OF FABRICATION OF ADHESIVE COMPOSITIONS

Because of the significant advances in the packaging technology, the hot melt adhesive compositions can be used by conventional polymer fabricating techniques. After the blending is complete, the adhesive mass can either be extruded and/or calendered to a uniform thickness on top of the substrate which would be paper, cloth, aluminum foil or glass fabric. The temperature and the through put of the extrusion are variable depending upon the viscosity of the tackifying mass and the desired coating thickness. Typically the temperature of extrusions and rolls may be from about 200° to 400° F. The substrates or backing to which the pressure sensitive adhesive compositions are applied may be of various porous or nonporous types and they may be organic or inorganic in nature. Most generally, these materials are those which are customarily employed in pressure sensitive tapes, either the cloth or paper backed types or tape backings made of synthetic materials, for example, polyesters such as the copolymer of ethylene glycol with terphthalic acid, vinyls such as a copolymer of vinlidene chloride and vinyl chloride, or a copolymer of vinylidene chloride and vinyl chloride, or a copolymer of vinylidene chloride with acrylonitrile, cellophane, cellulose acetate, polyvinyl chloride, polyvinyl acetate, polypropylene, polyethylene, ethylene-propylene plastic copolymer. Sheetings and tapes of cloth or textiles of either natural or synthetic fiber origin, such as glass fiber cloth, wood, and finally sheets or strips of metals such as steel, copper, aluminum, and alloys thereof can also be employed. In general, the backing employed are those which have been heretofore been conventionally employed in preparing pressure sensitive labels, tapes, sheetings and the like and the selection of any particular substrate material is not a specific novel feature of the present invention.

DETAILED DESCRIPTION OF THE INVENTION

The advantages of the hot melt adhesive compositions of the present invention can be more readily appreciated by reference to the following examples and tables. Unless otherwise specified, all measurements are in parts per hundred by weight.

EXAMPLE 1

Five hundred grams of an EPDM terpolymer (MD-76-5) was dissolved under agitation in 5000 ml. of n-hexane at about 40° C. After all this polymer was dissolved, the solution was cooled to low temperature and 8.90 ml. of active anhydride (94.50 mmoles) was added. After that, while stirring the mixture, 3.30 cc of 95% $H_2SO_4$ (58.30 mmoles) was added dropwise, the stirring of the solution was continued for an additional 30 minutes for the sulfonation reaction to complete. After this period, the sulfonation reaction was inactivated by adding 14.40 gm. of zinc acetate dissolved in 400/20 ml. mixture of $CH_3OH/H_2O$. Antioxidant 2246 (2.5 gm.) was then added to the cement and stirring was continued for an additional 30 minutes. The resultant neutralized sulfonated EPDM terpolymer was isolated by steam stripping. It was then washed with distilled water and pulverized with water in a Waring Blender, followed by filtering by a rubber drum. The final drying of the polymer was done in an aromatic dryer at 100° C.

The sulfur analyses on this sample was done by Dietert Sulfur analysis and the polymer was found to have sulfonate group of about 10 meq. per 100 gm. of sulfonated polymer.

The sample is identified as neutralized sulfonated EPDM terpolymer.

EXAMPLE 2

The neutralized sulfonated EPDM terpolymers of Example 1, and other similarly prepared samples, both with higher and lower sulfonation levels and low molecular weight polyisobutylene (Vistanex LM), were blended in the proportion, as indicated in Table III, and mixed into a homogeneous blend on a hot two-roll mill at about 150° C. for about 15 minutes.

TABLE III
BLENDS OF SULFONATED POLYMERS WITH VISTANEX AND/OR WITH PETROLEUM RESINS

| | Blend Number | | | | | | | | |
|---|---|---|---|---|---|---|---|---|---|
| | 1 | 2 | 3 | 4 | 5 | 6 | 7 | 8 | 9 |
| Kraton 1107 | 50 | — | — | — | — | — | — | — | — |
| S-EPDM (Zn) (~10 meq) | — | 50 | 50 | 50 | 50 | 30 | 30 | 50 | 30 |
| Vistanex-LM | — | 50 | 50 | 50 | 50 | 70 | 70 | 25 | 40 |
| Stearic Acid | — | 0.5 | 0.5 | — | — | — | — | — | — |
| Flexon 644 | — | — | — | — | 5 | — | 5 | — | — |
| Wingtak Plus | 50 | — | 100 | — | — | — | — | 25 | 30 |

All the blends were mill mixed on a hot two-roll mill. The temperature of the front and back roll of the mill was in the range of 130° to 150° C. Blend number 1 is one of the standard of industry and was used for comparative purposes.

EXAMPLE 3

Various properties of interest of blends of Table III were evaluated following standard ASTM tests. Both qualitative and quantitative data of these blends are shown in the following Table IV.

TABLE IV

QUALITATIVE AND QUANTITATIVE PROPERTIES OF VARIOUS BLENDS OF TABLE III

| Blend No. | Strength | Tackiness | Clarity | Bond Strength (lbs.) | Mode of Failure* | Transfer** |
|---|---|---|---|---|---|---|
| 1 | High | Tacky | Clear | 11.9 | C.F. | Medium |
| 2 | High | Tacky | Clear | 0.6 | A.F. | Slight |
| 3 | High | Slightly Tacky | Clear | 7.4 | A.F. | Slight |
| 4 | High | Tacky | Slightly Cloudy | 1.5 | A.F. | Slight |
| 5 | Medium | Tacky | Slightly Cloudy | — | A.F. | Slight |
| 6 | Low | Very Tacky | Slightly Cloudy | 1.5 | C.F. | Heavy |
| 7 | Low | Very Tacky | Clear | 1.0 | C.F. | Heavy |
| 8 | High | Tacky | Slightly Cloudy | 2.6 | A.F. | Slight |
| 9 | Low | Very Tacky | Clear | 2.7 | C.F. | Heavy |

Kraton 1107 is a block copolymer of the structure ABA in which A is a block of styrene (total ~15% by weight) whose number average molecular weight is in the range of 10,000 to 30,000. B is an elastic block of isoprene (~85%) having a number average molecular weight of about 100,000. TP-398 is a zinc salt of the sulfonated ethylene propylene copolymers (EPDM's). These polymers are described in various U.S. patents, for example, see U.S. Pat. No. 3,642,728. Vistanex-LM is a low molecular polyisobutylene and is an Exxon's proprietary material described in detail in various U.S. patents. Stearic acid is one of the plasticizers used as flow improvers in the sulfonated EPDM systems. Flexon 644 is a naphthenic basestock feed aromatic oil. Wingtak and Escorez resins are commercial tackifiers having a melting point in the neighborhood of 80°-90° C. These are hydrocarbon resins derived from petroleum or coal tar distillates, aliphatic dienes and monolefins of 5 or 6 carbon atoms.

The bond strength values appearing in the fifth column of Table IV were obtained by a method similar to ASTM D-429 adhesion test. In brief, the samples were sandwiched between mylar sheets and pressed to a thickness of about 25 mils using a hot press. Rectangular strips of ¾" width and 3" long were cut and 90° peel tests were performed on an Instron at room temperature. The resin free sections of the mylar film were clamped into air jaws to avoid any slippage during pulling. The samples were pulled at 5"/minute crosshead speed. The force and elongation of the samples were recorded on a strip recorder. The force necessary to separate the mylar sheets was taken as the bond strength of the blend and a measure of its cohesive strength and adhesive nature. The initial peak values are reported in the fifth column of Table IV. The qualitative nature of the tackiness of the blends were determined by technician's subjective "finger test" method. It is clear from this Table that various binary and tertiary blends of sulfonated EPDM polymers incorporating low molecular weight polyisobutylenes for example, blend numbers 2, 3, 7, 8 and 9 have very attractive tackifying characteristics; and hence, make excellent basis for various pressure sensitive adhesive applications, especially as hot melt adhesive compositions.

What is claimed is:

1. A hot melt adhesive composition which consists of:
(a) a neutralized sulfonated EPDM terpolymer having about 5 to about 50 meq. of neutralized sulfonated groups per 100 grams of said neutralized sulfonated EPDM terpolymer;
(b) about 25 to about 250 parts by weight of a polyisobutylene per 100 parts of the neutralized sulfonated polymer;
(c) about 25 to about 250 parts by weight of a hydrocarbon resin of a petroleum or coal tar distillate per 100 parts by weight of said neutralized sulfonated EPDM terpolymer; and 2. A hot melt adhesive composition according to claim 1, wherein said EPDM terpolymer consists of about 40 to about 65 weight percent of ethylene, of about 25 to about 53 weight percent of propylene and of about 2 to about 10 weight percent of a non-conjugated diene.

3. A hot melt adhesive composition according to claim 2, wherein said non-conjugated diene is 5-ethylidene-2-norbornene.

4. A hot melt adhesive composition according to claim 1, wherein said neutralized sulfonate groups are neutralized with a counterion selected from the group consisting of ammonium, aluminum, antimony, iron, lead and Groups IA, IIA, IB and IIB of the Periodic Table of Elements.

5. A hot melt adhesive composition according to claim 1, wherein said neutralized sulfonate groups are neutralized with zinc ions.

6. A hot melt adhesive according to claim 1 further including about 1 to about 50 parts by weight of an ionic preferential plasticizer per 100 parts by weight of said neutralized sulfonated EPDM terpolymer, wherein said preferential plasticizer is selected from the group consisting of carboxylic acids having about 8 to about 22 carbon atoms, metallic salts of said carboxylic acids, amides having an aliphatic group of about 8 to about 22 carbon atoms, amines, ureas and thioureas and mixtures thereof.

7. A hot melt adhesive composition according to claim 6, wherein said sulfonated neutralized EPDM terpolymer contains about 7 to about 20 meq. of neutralized sulfonated groups per 100 grams of polymer.

8. A hot melt adhesive composition according to claim 7, wherein said preferential plasticizer is said metallic salt of said carboxylic acid.

9. A hot melt adhesive composition according to claim 8, wherein said metallic salt of said carboxylic acid is zinc stearate.

10. A hot melt adhesive composition according to claim 1 or 6 further including about 1 to about 150 parts by weight of a filler per 100 parts by weight of said neutralized sulfonated EPDM terpolymer, said filler being selected from the group consisting of calcium carbonates, silicas, carbon blacks, clays and talcs and mixtures thereof and/or less than about 100 parts by weight of an oil having less than 2 weight percent polars per 100 parts by weight of said neutralized sulfonated EPDM terpolymer.

11. A hot melt adhesive composition according to claim 1 or 8 wherein said hydrocarbon resin has about 5 to 6 carbon atoms and consists of aliphatic dienes, mono and diolefins and cyclic olefins.

* * * * *